United States Patent [19]

Föhl

[11] Patent Number: 4,494,774
[45] Date of Patent: Jan. 22, 1985

[54] BELT BAND-CLAMPING ARRANGEMENT FOR SAFETY BELTS IN MOTOR VEHICLES

[75] Inventor: Artur Föhl, Schorndorf, Fed. Rep. of Germany

[73] Assignee: REPA Feinstanzwerk GmbH, Aldorf, Fed. Rep. of Germany

[21] Appl. No.: 606,850

[22] Filed: May 3, 1984

Related U.S. Application Data

[63] Continuation of Ser. No. 550,981, Nov. 10, 1983, abandoned, which is a continuation of Ser. No. 296,166, Aug. 25, 1981, abandoned.

[30] Foreign Application Priority Data

Aug. 26, 1980 [DE] Fed. Rep. of Germany ....... 3032169

[51] Int. Cl.³ .............................................. B60R 21/10
[52] U.S. Cl. ..................................... 280/806; 280/808; 242/107.4 A
[58] Field of Search ....................... 280/806, 808, 807; 242/107.2, 107.4 A

[56] References Cited

U.S. PATENT DOCUMENTS

| 3,287,062 | 11/1966 | Board et al. | 280/801 |
| 4,120,466 | 10/1978 | Adomeit | 280/806 |
| 4,128,261 | 12/1978 | Paitula | 280/806 |
| 4,278,215 | 7/1981 | Nakaho | 280/806 |
| 4,359,237 | 11/1982 | Gavagan et al. | 280/806 |

Primary Examiner—Robert R. Song
Attorney, Agent, or Firm—Yount & Tarolli

[57] ABSTRACT

Belt band clamping device for safety belt in motor vehicles having a roll-up roller on which the belt is wound and unwound, and a swivelable deflector member having a cambered deflector surface which interacts with a fixed clamping surface in such manner that an increased torque acting on the deflector, tilts it, and causes the belt to be locked between the clamping surface and the deflector member.

10 Claims, 14 Drawing Figures

BELT BAND-CLAMPING ARRANGEMENT FOR SAFETY BELTS IN MOTOR VEHICLES

This is a continuation of application Ser. No. 550,981 filed Nov. 10, 1983 which is itself a continuation of Ser. No. 296,166 filed Aug. 25, 1981.

BACKGROUND OF THE INVENTION

1. Field of the Invention

The invention relates to a belt braking system for safety belts in motor vehicles and, more particularly, refers to a new and improved belt band-clamping arrangement in combination with an automatic roll-up device in which the belt can be reeled up on a belt drum and reeled off against a spring load.

2. Description of the Prior Art

A known deflector fitting with clamping arrangement for a safety belt, German Published Non-Prosecuted Application No. 2,540,302, has a double-armed lever deflector element which can be swiveled and is supported on a U-fitting plate. The element is equipped on one lever arm with a round deflector pin having a rounded deflector surface while the other lever is developed as part of the clamping device. The belt is wrapped around the top deflector peg and is run between a clamping surface of the bottom lever arm and a clamping surface mounted on the fitting plate. The deflector element with respect to the clamping device is kept at a released position by a spring load on one of the lever arms. With the occurrence of a suddenly increased load on the belt band, the double-armed lever is deflected by a torque produced on the lever-like deflector element, which locks and brakes the belt band between deflector element- and fitting plate clamping surfaces. With a slackened load the deflector element is automatically swiveled back to its released position by the force of the spring. The fabrication of a deflector element in accordance with the design of this concept is expensive since it requires an extremely stable deflector element and support because on being subjected to loadings, extremely high lever forces—produced by the relatively large-size lever arms—act on the deflector element and the swiveling support.

A roll-up device for a safety belt is disclosed in German Published Prosecuted Application No. 1,481,969, in which a fitting housing encloses a belt drum provided for belt storage, and a clamping device for belt clamping. The clamping device includes a clamping jaw having a circular segmental shape is supported to swivel at its center on the housing. The belt band passes around the circular segmental shape of the clamping jaw. A further stationary clamping jaw is arranged at the housing at the belt surface level. In operational connection with the clamping jaw which swivels is a spring loaded braking device following a belt reel-off and brief belt band rereeling—e.g. in case of a crash—both of said clamping jaws are clamped together, and the braking device locks the swivelable clamping jaw and prevents any further reel-off. The braking device has a mechanism which keeps the clamping jaw which swivels at a released position. This mechanism can be manually timed at various actuating positions, e.g. in a release for putting on the safety belt. This mechanism, too, is expensive and difficult to operate.

SUMMARY OF THE INVENTION

An object of the invention is to provide a belt clamping device for safety belts of simplified design under highly comfortable operating conditions and with improved stability based on dimensional reduction.

With the foregoing and other objects in view, there is provided in accordance with the invention a belt-braking system for safety belts in motor vehicles, which comprises an automatic roll-up device having a roll-up roller on which a safety belt is wound and which normally is unwound by pulling the belt against the force of a spring and which belt during abnormal operation exerts an increased torque, a belt-brake having a swivelable deflector member with a cambered deflector surface partly wrapped around by said belt from said automatic roll-up device, a fitting in which said deflector member is eccentrically supported, a clamping member with a clamping surface spaced from said deflector surface to permit free movement of the belt between the deflector surface and clamping surface, spring means urging the deflector surface away from the clamping surface during normal operation, said increased torque during abnormal operation countering said spring means and swiveling the eccentrically supported deflector member with its deflector surface moving against the clamping surface and clamping the belt therebetween.

Other features which are considered as characteristic for the invention are set forth in the appended claims.

Although the invention is illustrated and described herein as embodied in a belt band-clamping arrangement for safety belts in motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which:

FIGS. 11 and 12 illustrate a belt band clamping device according to FIGS. 6-10 in conjunction with an automatic roll-up device, in which FIG. 11 shows a lateral cut and FIG. 12 a frontal cut through the device, FIG. 13 diagrammatically illustrates another embodiment of the belt band clamping device according to the invention in conjunction with a deflector fitting.

DETAILED DESCRIPTION OF THE INVENTION

The movable clamping member used in the present invention is a simple, easy-to-manufacture roller, which on the one hand functions as deflector surface for the belt band, and on the other hand effects a safe lock for the latter by its special, i.e. eccentric support provided in the event of load acceleration. With an increased pullback force acting on the belt band when using the clamping device with a deflector fitting or on actuating an automatic locking system when using the clamping device with an automatic roll-up device, the roller is pressed with great force against the stationary clamping surface, dependent on the roller eccentric support and resultant leverage conditions, so that any further belt pull-off is impossible. On slackening of the increased load, or on releasing the automatic roll-up device the roller under spring load is automatically swiveled back to the released position for belt pull-out or reel-in without restriction from the clamping device.

A considerably simplified design is produced by mounting a stop pin on the roller, which to a limited extent is swivelable in the side walls of a U-fitting and simultaneously serves as an abutment for the spring, which latter keeps the roller away from the stationary clamping surface.

The invention is explained with reference to embodiments shown in the drawings and described below.

FIGS. 1–4 a belt band clamping device is shown in conjunction with a deflector fitting which, e.g. can be mounted to swivel on a motor vehicular vertical member. The deflector fitting is U-shaped with a base plate 1 having two side walls 2 and 3. The substantially triangular base plate 1 is mounted to swivel at its center on the motor vehicular frame. A cylindrical roller 5 has an external surface friction coefficient lower than that of the textile-web belt band 6.

Roller 5 is supported in openings 8 of sidewalls 2 and 3 by means of bearing pins 7, which are pressed eccentrically to the roller axis into the ends of roller 5. A stop pin 9 eccentric to the roller axis is pressed into an end of roller 5. Stop pin 9 extends into a slot 10 in sidewall 2, to be guided there to a limited swiveling extent. Thereby, the roller 5 can carry out only a preset limited swiveling motion around the swivel axis, i.e. around bearing pins 7.

Figure 1:
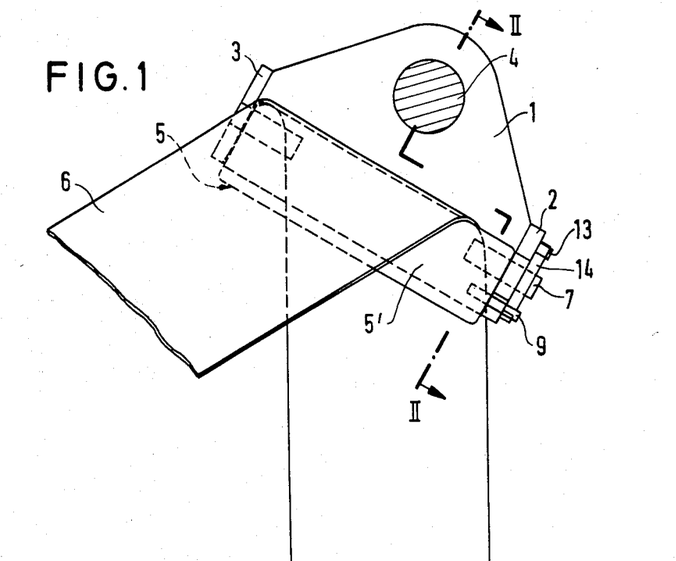
FIG. 1 diagrammatically illustrates a front view of a first embodiment of the belt band clamping device with a deflector fitting according to the invention.
Figure 2:
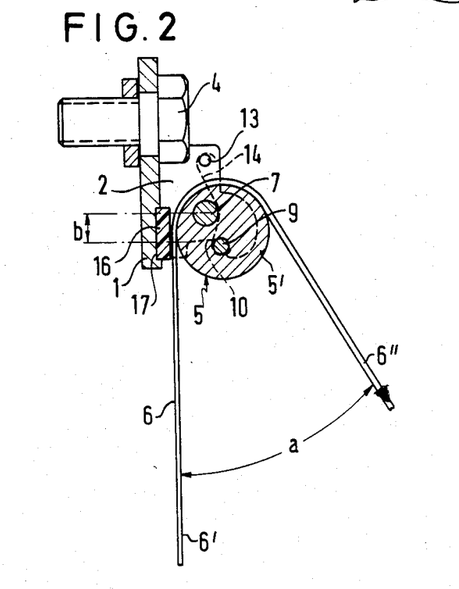
FIG. 2 is a side view of a lateral cut through the belt band clamping device of FIG. 1, FIGS. 3 and 4 are a perspective and an exploded view, respectively, of the belt band clamping device according to FIGS. 1 and 2.
Figure 3:
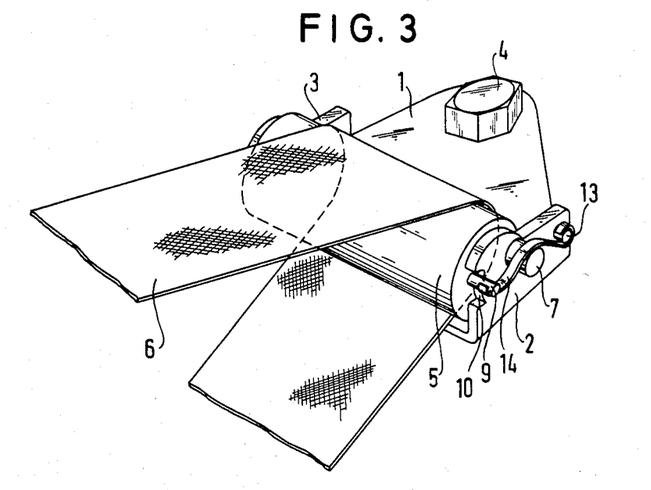
Figure 4:
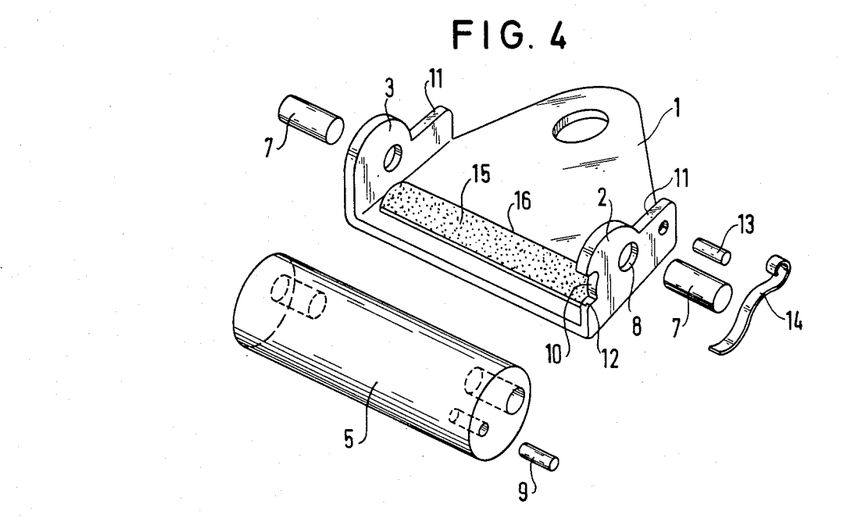

Sidewalls 2 and 3 are provided with rounded edges designated as 11 and 12 to prevent any damaging engagement of belt band 6 with the edges. A brake pin 13 is mounted on sidewall 2 and projects, as does bearing pin 7, from the outer boundaries of sidewall 2 and serves as an abutment for a leaf type spring 14. Spring 14 is prestressed against the roller stop pin 9, which also projects from the outer boundary surface of sidewall 2, and pushes roller 5 against the edge of slot 10 furthest from base plate 1 into a released position. A gap remains between roller 5 and base plate 1 permitting belt band 6 to run freely without touching the base plate or touching a clamping surface 15 of clamping piece 16. As shown in FIG. 2, the belt 6 loops around roller 5 at an angle a. Belt band section 6' vertically runs to an automatic roll-up device mounted adjacent to the motor vehicular floor while belt band section 6'' runs outward at a slant to protect the seat occupant, and then is fixed at its free end to a belt lock. When the belt band is in normal use, i.e. putting on the belt band 6 around the occupant, and with a normal motion associated therewith, the belt runs freely on roller 5, which—as shown in FIG. 2—is kept in a released position by spring 14. With a suddenly produced load acceleration, e.g. in case of a crash, the belt section 6'' is forcefully pulled in the direction of the arrow shown in FIG. 2. Dependent on the load acting on belt, 6 the roller 5 is swiveled against clamping surface 15. As a result, belt 6 is locked and braked between roller 5 or its rounded deflector surface 5' and clamping surface 15. The swiveling motion of roller 5 may follow after the automatic lock in the roll-up automatic device has been actuated. In the exemplified embodiment the clamping piece 16 has a rectangular shape and is made of an elastic material with nonskid characteristics exceeding that of belt 6. A slot 17 is molded or engraved into a fitting base plate 1 to mount clamping piece 16. The clamping piece 16 is friction locked, vulcanized or glued into slot 17. On slackening of the suddenly produced load on belt section 6' and upon release of belt 6 in the automatic roll-up device, the roller 5 automatically reswivels into the release position as shown in FIG. 2.

Figure 5:
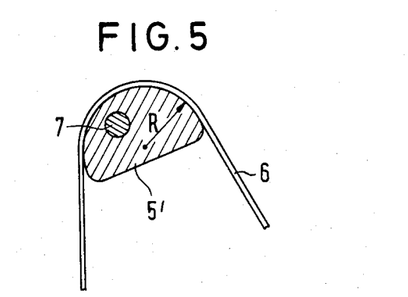
FIG. 5 illustrates another embodiment showing a modified form of deflector roller which may be used instead of the roller in FIGS. 1-4, FIGS. 6-10 illustrate a further embodiment of the belt band clamping device according to the invention.

In the embodiment according to FIG. 5, a deflector surface for belt band 6 is formed by using a smoothed-down roller 5' with a radius R. Bearing pins 7 in roller 5' are arranged eccentrically to the roller axis. The round surface of roller 5' forms a deflector surface as well as swivelable clamping surface for belt band 6.

In the embodiment according to FIGS. 6–10, e.g. a deflector device 19 is mounted on the vehicular frame beneath belt drum 18 of (not shown) automatic roll-up device. Deflector device 19 has a base plate 20 and two U-shaped sidewalls 21 on which a roller 23 is eccentrically mounted by means of bearing pin 22. The roller 23 is pushed into the release position by a spring 26 against a stop pin 24. Spring 26 is supported by bearing pin 22 and the extended end of a transverse bar 25. The stop pin 24 is guided in an oblong, circular-cambered limit slot 27 in one of the sidewalls 21, which limits the swiveling motion of roller 23. The transverse spar 25 carried in rectangular supporting recesses 28 of sidewalls 21 serves as carrier for a clamping piece 29, which preferably, too, consists of an elastic, nonskid strong material, and is glued on, clipped on or vulcanized onto transverse bar 25. In this embodiment a sleeve 30 is slidingly slipped onto roller 23.

Figure 6:
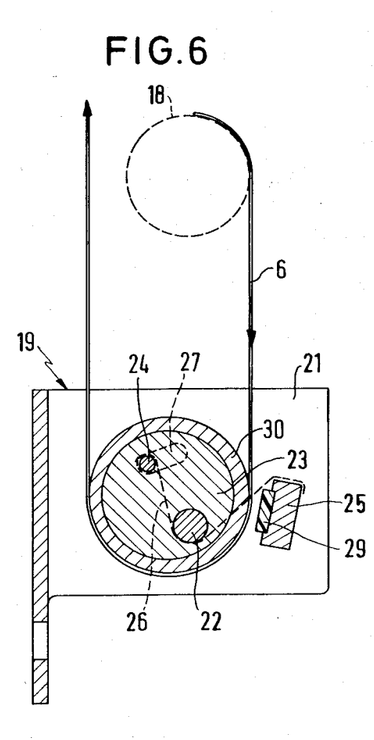
FIGS. 6 and 7 are side views showing the clamp in released and clamped position.
Figure 7:
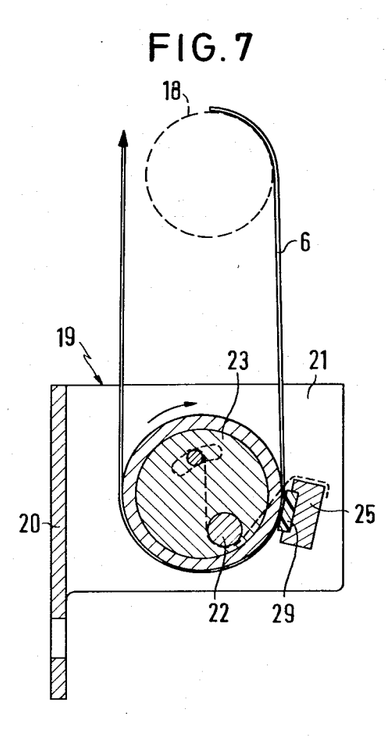
Figure 8:
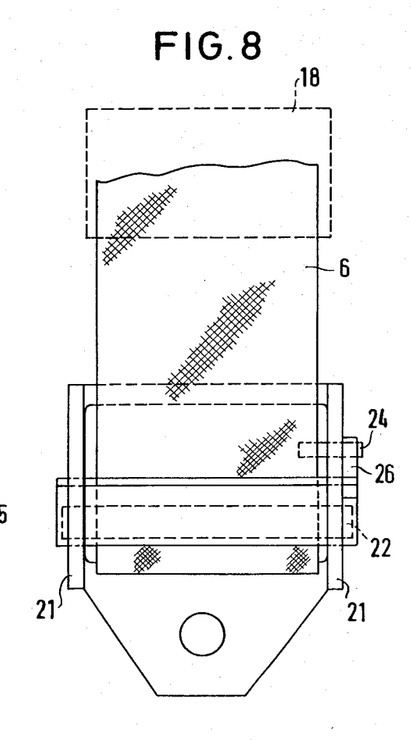
FIG. 8 is a front view.
Figure 9:
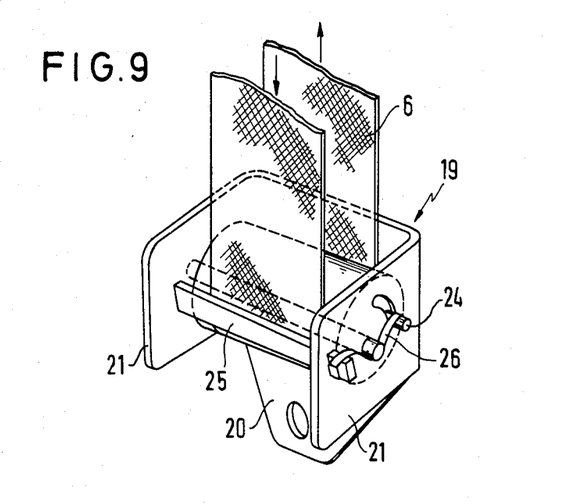
FIG. 9 is a perspective view and FIG. 10 is an exploded view.
Figure 10:
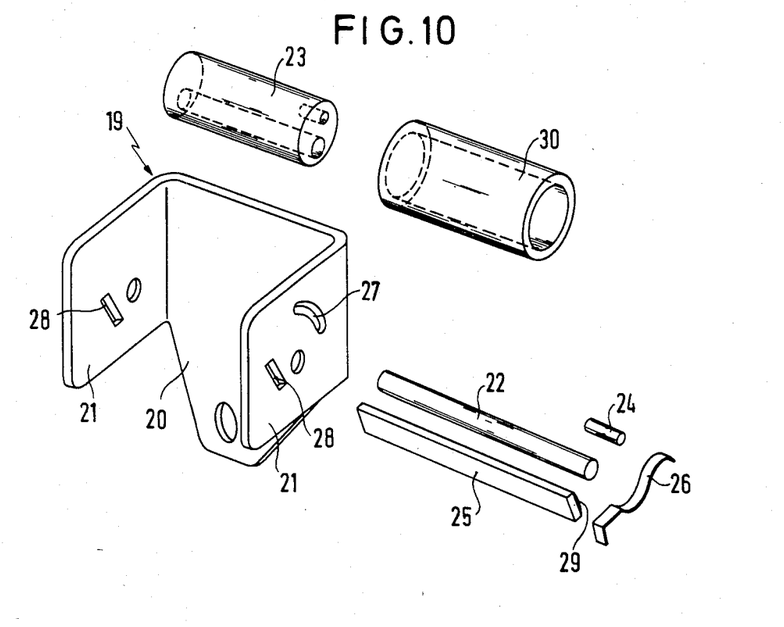

The above-described device works in similar fashion to that of the first exemplified embodiment. Following the lock-up of belt drum 18 of the (not shown) automatic roll-up device, an increased load is put on the belt band, which is partially looped around roller 23 in the direction of the arrow as shown in FIGS. 6 and 7. This increased load is transmitted to roller 23 which counters or overcomes the load of spring 26 and because roller 23 has an eccentric support, is swiveled from a release position according to FIG. 6 back into a clamping position according to FIG. 7, with immediate interlocking of belt 6 with the surface of clamping piece 29.

Figure 11:
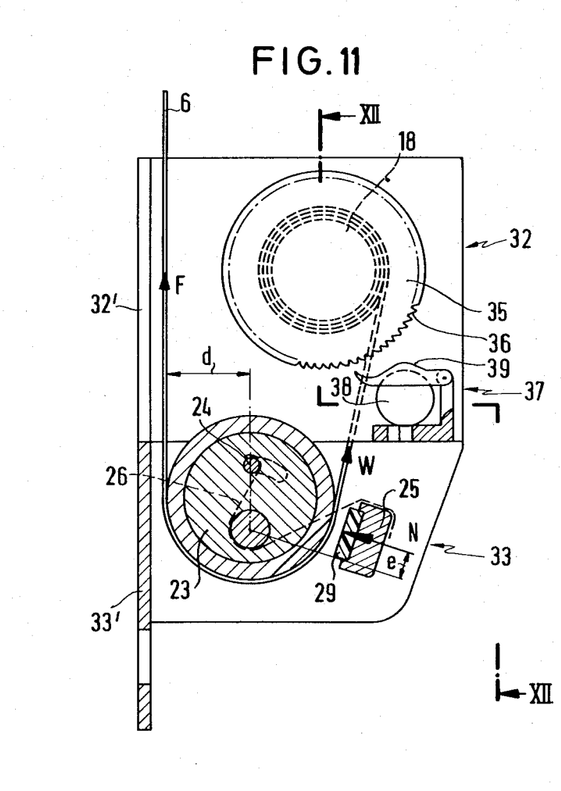
Figure 12:
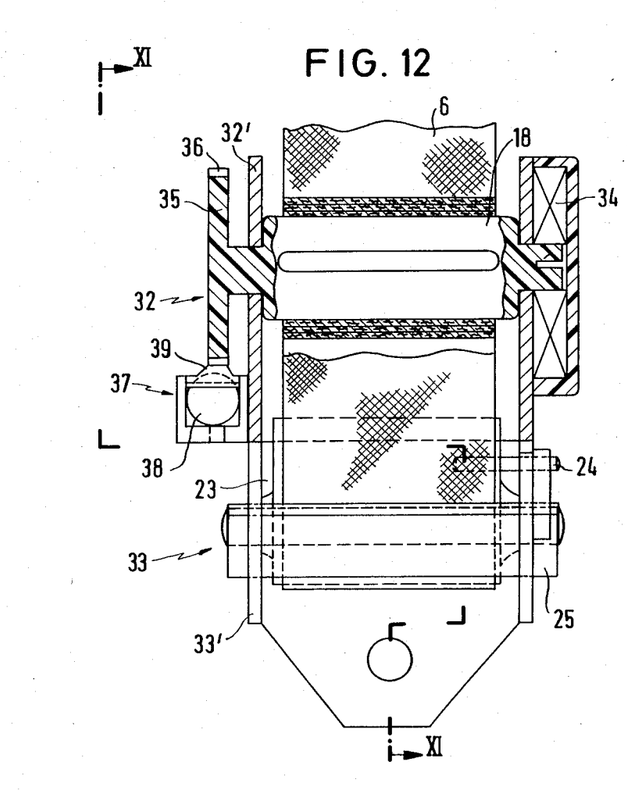

The embodiment according to FIGS. 11 and 12 exemplifies of lightweight construction an automatic roll-up device generally designated as 32 plus a clamping device generally designated as 33. The U-shaped fittings 32' and 33' of both automatic roll-up and clamping devices can be in one piece or comprise separate fitting components, which are interconnected. Clamping device 33 is similar to the clamping device shown with reference to FIGS. 6–10 and described above, and is equipped with a roller 23, which is eccentrically supported on the sidewalls, and with a transverse bar 25 having a clamping piece 29, a stop pin 24 and spring 26. Belt drum 18 is rotatably supported between U-shape bent-down sidewalls of fitting 32′ of automatic roll-up device 32, and is coupled with a reel-back spring 34, which is fitted into a housing (not shown in any detail). On the other side of fitting 32′, i.e. the opposite sidewall, the belt drum 18 is rotatably connected to ratchet wheel 35 with fine indentations 36. Ratchet wheel 35, in operational connection with a release system generally designated as 37, has a solid ball 38 and a catch lever 39. With a torque increase at belt 6 in the direction of the arrow, as shown in FIG. 11, the catch lever 39 is lifted upward by the shifted solid ball 38 and moves its point into ratchet lock 36, which locks up belt drum 18. As a result, roller 23 with its deflector- and clamping surfaces is swiveled against clamping piece 29, which effects an immediate lock-up and complete braking of belt band 6.

Increased loads boost the compression force effective between movable and stationary clamping surfaces. With the clamping device assuming the load, the belt drum 18 of automatic roll-up device 32 and, indeed, the entire roll-up- and lock-up system is relieved of the load. Eccentric roller power- and work arm leverages can be adapted to any given magnitude by the eccentric support of roller 23 with reference to roller center or roller axis. In FIG. 11 the power and work leverages effective on system actuation are indicated. In this case coercive force W equates the product of $\mu$ times normal force N, whereby torque F times the lever arm d of a force equals the product of normal force N and lever arm e, and torque F is lower than the product of $\mu$ times normal force N.

Figure 13:
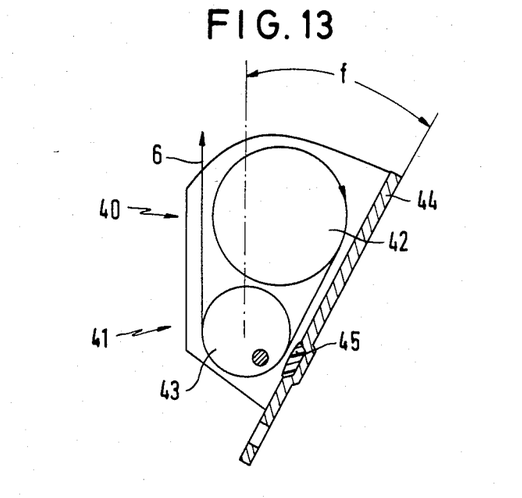

In FIG. 13 a simple solution of an interconnection between automatic roll-up device 40 and clamping device 41 is shown. Therein the center lines of belt drum 42 and eccentrically supported roller 43 are supported by a single fitting component 44 inclined at an angle f with reference to the vertical. A clamping piece 45 in a punched-in type manufactured slot is mounted on the base plate of a fitting part 44. On loadings, the belt band 6 can be pulled out through an inclination of this system at an angle f without exercising any notable force on belt drum 42. With this arrangement a transverse bar used as a carrier for a clamping piece can be omitted. On loadings the roller 43 can be pressed against clamping piece 45 or directly against the surface of the fitting 44.

Figure 14:
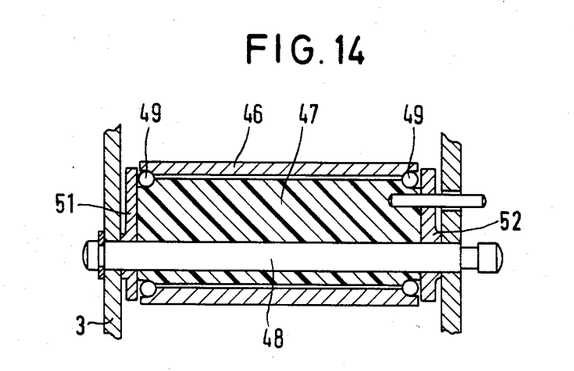
FIG. 14 illustrates a specially developed belt band clamping device roller having a sleeve mounted on roller bearings.

FIG. 14 shows the low-friction support of a belt band deflector surface forming sleeve 46 of a roller 47, which is eccentrically supported on a bearing shaft 48. Bearing shaft 48 is solidly pressed into the fitting sidewalls 2 and 3 and, e.g. protected by safety disks. The roller 47 at its opposing front ends has ring groove for forming tracks for roller bearings, e.g. balls 49, which are guided in cages. At its opposing front ends the sleeve 46 is equipped with matching profile channels. The described arrangement is axially protected by lateral cover disks 51 and 52 and externally capped against dirt penetration.

I claim:

1. Belt-braking system for safety belts in motor vehicles, which comprises an automatic roll-up device having a roll-up roller on which a safety belt is wound and which normally is unwound by pulling the belt against the force of a spring and which belt during abnormal operation exerts an increased torque, a belt-brake having a swivelable deflector roller member with a cambered deflector surface partly wrapped around by said belt from said automatic roll-up device, a fitting in which said deflector member is eccentrically supported to swivel about an axis with the cambered deflector surface eccentric to the axis, said deflector fitting staged behind the automatic roll-up device as a separate unit, a clamping member with a clamping surface spaced from said deflector surface to permit free movement of the belt between the deflector surface and the clamping surface, said deflector surface serving both as a clamping surface and as a deflector surface for the belt, spring means urging the deflector surface away from the clamping surface during normal operation after the belt has been put on, said increased torque during abnormal operation countering said spring means and swiveling the eccentrically supported deflector member with its deflector surface moving against the clamping surface clamping the belt therebetween.

2. Belt-braking system for safety belt in motor vehicles, which comprises an automatic roll-up device having a roll-up roller on which a safety belt is wound and which normally is unwound by pulling the belt against the force of a spring and which belt during abnormal operation exerts an increased torque, a belt-brake having a swivelable deflector member with a cambered deflector surface partly wrapped around by said belt from said automatic roll-up device, a fitting in which said deflector member is eccentrically supported, a clamping member with a clamping surface spaced from said deflector surface to permit free movement of the belt between the deflector surface and clamping surface, spring means urging the deflector surface away from the clamping surface during normal operation, said increased torque during abnormal operation countering said spring means and swiveling the eccentrically supported deflector member with its deflector surface moving against the clamping surface and clamping the belt therebetween and, wherein said fitting has side walls in which the deflector member is mounted, wherein one of said side walls has a slot in which is a limit stop pin affixed to the deflector member, and wherein the slot is shaped as a circular segment to limit the swivel angle.

3. Belt-braking system according to claim 2, wherein said pin guided in said slot of said sidewall, projects over said sidewall, and also serves as an abutment for one end of a spring of said spring means which keeps the deflector member from touching the clamping surface in normal operation.

4. Belt-braking system according to claim 3, wherein said spring is a leaf type spring, and wherein a brake pin fixed to the sidewall serves as an abutment for the other end of the leaf spring, and wherein said leaf spring at an intermediate point between the abutments passes over a deflector member bearing pin extending from the sidewall.

5. Belt-braking system according to claim 1, wherein said roller has a sleeve which slidingly slips onto said roller.

6. Belt-braking system according to claim 5, wherein said sleeve has a low-friction deflector surface, and wherein said sleeve is supported on said roller by roller bearing means.

7. Belt-braking system according to claim 2 wherein said fitting is U-shaped formed of a base plate and two side walls, wherein a support member for the clamping surface is a bar extending between and supported by the side walls of said fitting, wherein the clamping surface is an elastic-yielding coating of high nonskid strength, which is clip-mounted on the plate of the U-fitting or on said bar extending between the side walls of said fitting.

8. A device for clamping a safety belt in a motor vehicle, said device comprising a clamp member, a roller having an arcuate outer side surface around which the belt is wrapped and which cooperates with said clamp member to define a nip through which the belt passes, means for supporting said roller for pivotal movement about a support axis which is offset from the center of curvature of the arcuate outer side surface of said roller, said roller being pivotal about said support axis in a direction toward said clamp member to decrease the size of the nip and clamp the belt between the outer side surface of said roller and said clamp member, said roller being pivotal about said support axis in a direction away from said clamp member to increase the size of the nip and release the belt for movement through the nip, spring means for urging said roller to pivot about said support axis in a direction away from said clamp member, a stationary stop surface located a predetermined distance from said clamp member, and a movable stop surface connected with said roller and movable into abutting engagement with said stationary stop surface to limit the extent of pivoting movement of said roller in a direction away from said clamp member to thereby limit the maximum size of the nip and the distance through which said roller must move toward said clamp member to clamp the belt, said roller being pivotal toward said clamp member against the urging of said spring means under the influence of force applied against the outer side surface of said roller by the belt to clamp the belt against said clamp member.

9. A device as set forth in claim 8 further including a base member, means for pivotlly connecting said base member with the vehicle for allowing said base member to pivot relative to the vehicle, said means for supporting said roller including means for connecting said roller with said base member, said base member being pivotal relative to the vehicle under the influence of force applied against said roller by the belt.

10. A device as set forth in claim 8 wherein said roller includes a rotatable sleeve upon which said arcuate outer side surface is disposed, a sleeve support member at least partially disposed within said sleeve and circumscribed by said sleeve, means for supporting said sleeve for rotational movement about an axis which extends through the center of curvature of the arcuate outer side surface of said sleeve.

* * * * *